United States Patent
Ikeda et al.

(10) Patent No.: US 9,718,356 B1
(45) Date of Patent: Aug. 1, 2017

(54) MOUNTING STRUCTURE (71) Applicant: TOYOTA JIDOSHA KABUSHIKI KAISHA, Toyota-shi, Aichi-ken (JP)

(72) Inventors: Akihiko Ikeda, Miyoshi (JP); Teppei Yamashita, Anjo (JP); Fumiaki Shigematsu, Gamagori (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/407,933

(22) Filed: Jan. 17, 2017

(30) Foreign Application Priority Data

Jan. 29, 2016 (JP) ................................. 2016-016709

(51) Int. Cl.
| F16M 13/00 | (2006.01) |
| B60K 26/00 | (2006.01) |
| B60K 6/26 | (2007.10) |
| B60K 6/36 | (2007.10) |
| B60K 17/16 | (2006.01) |
| B60K 6/405 | (2007.10) |
| B60K 20/00 | (2006.01) |

(52) U.S. Cl.
CPC ............... *B60K 26/00* (2013.01); *B60K 6/26* (2013.01); *B60K 6/36* (2013.01); *B60K 6/405* (2013.01); *B60K 17/16* (2013.01); *B60K 20/00* (2013.01)

(58) Field of Classification Search
CPC . B60K 6/26; B60K 6/36; B60K 6/405; B60K 17/16; B60K 20/00; B60K 26/00; F16M 13/04

USPC .......................................................... 248/548
See application file for complete search history.

(56) References Cited

U.S. PATENT DOCUMENTS

| 5,906,410 A | * | 5/1999 | Dalinkiewicz | .......... B60R 19/00 296/187.03 |
| 2010/0032542 A1 | * | 2/2010 | Heitkamp | ............... B60K 17/24 248/548 |
| 2014/0117198 A1 | * | 5/2014 | Shimada | ................... B60K 1/00 248/560 |

FOREIGN PATENT DOCUMENTS

| JP | 2014-168356 A | | 9/2014 |
| JP | 2014168356 A | * | 9/2014 |
| JP | 2015-009724 A | | 1/2015 |
| WO | 2013/012001 A1 | | 1/2013 |
| WO | 2015/001408 A2 | | 1/2015 |

* cited by examiner

*Primary Examiner* — Todd M Epps
(74) *Attorney, Agent, or Firm* — Oliff PLC (57) ABSTRACT

Provided is a mounting structure including an electronic control unit, a plurality of support brackets, a transaxle case, an intermediate bracket protruding from the transaxle case toward a rear side of the vehicle, and an engaging projection. The engaging projection is a projection that is provided to at least one of an upper surface of the intermediate bracket or a bottom surface of the electronic control unit in a region where the intermediate bracket is in surface contact with a mounting surface of the transaxle case, the engaging projection protruding in a direction toward the upper surface of the intermediate bracket and the bottom surface of the electronic control unit. The engaging projection presses the intermediate bracket against the mounting surface of the transaxle case responding to displacement of the electronic control unit at the time of vehicle collision.

5 Claims, 6 Drawing Sheets

$Fxa = (Fb - Fzb)\mu$

FIG. 10
[RELATED ART]

MOUNTING STRUCTURE

CROSS-REFERENCE TO RELATED APPLICATIONS

This application claims priority to Japanese Patent Application No. 2016-016709 filed on Jan. 29, 2016, the entire contents of which are hereby incorporated by reference.

BACKGROUND

1. Technical Field

The present disclosure relates to a technique of disposing an electronic control unit above a transaxle via a plurality of support brackets.

2. Description of Related Art

There is known a mounting structure in which (i) an electronic control unit has a plurality of support brackets that are provided so as to be spaced apart from each other in a longitudinal direction of a vehicle and to protrude downward, and (ii) the electronic control unit is attached to a transaxle case in a state of floating above the transaxle case via the plurality of support brackets. The structure described in Japanese Patent Application Publication No. 2014-168356 (JP 2014-168356 A) is its one example in which a power control unit (PCU) including an inverter and so on, as an electronic control unit, is disposed above a transaxle for a hybrid vehicle including an electric motor for use as a travel driving force source and is attached to the transaxle via a plurality of support brackets.

In the meantime, in such a mounting structure, when, for example, the rear-side support bracket, on the rear side of the vehicle, of the plurality of support brackets described above is provided at a position spaced from the transaxle case toward the rear side of the vehicle, it may be considered that (iii) an intermediate bracket protruding from the transaxle case toward the rear side of the vehicle is integrally fixed to a flat mounting surface at a rear end of an upper surface of the transaxle case, and that (iv) the rear-side support bracket is fixed to a protruding portion of the intermediate bracket (unknown). In this case, for example, any one of a plurality of kinds of electronic control units with different sizes per type of vehicle can be attached to a transaxle case that is commonly used regardless of the type of vehicle.

However, in the case where the rear-side support bracket is fixed at the position spaced from the transaxle case toward the rear side of the vehicle as described above, when a collision load toward the rear side of the vehicle is applied to the electronic control unit at the time of vehicle collision, a moment is generated by a load that is applied from the rear-side support bracket to the intermediate bracket, so that there is a possibility that a load in a lifting direction may act on a fixed portion of the intermediate bracket to the transaxle case, resulting in a decrease in fixing strength. When the fixing strength is decreased, the intermediate bracket along with the electronic control unit may come off the transaxle case, or the transaxle case may be subjected to failure due to the dislocation of the intermediate bracket.

Figure 9:
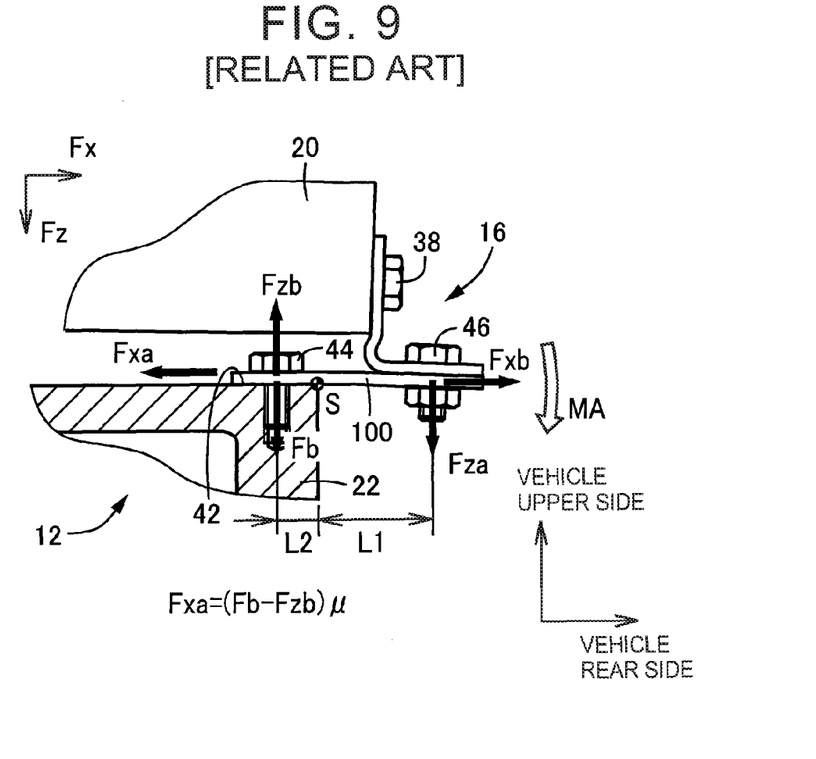
FIG. 9 is a diagram, corresponding to FIG. 6, showing loads that act on respective portions at the time of vehicle collision when an electronic control unit is attached to a transaxle case via an intermediate bracket having no engaging projection differently from the first embodiment of the present disclosure.
Figure 10:
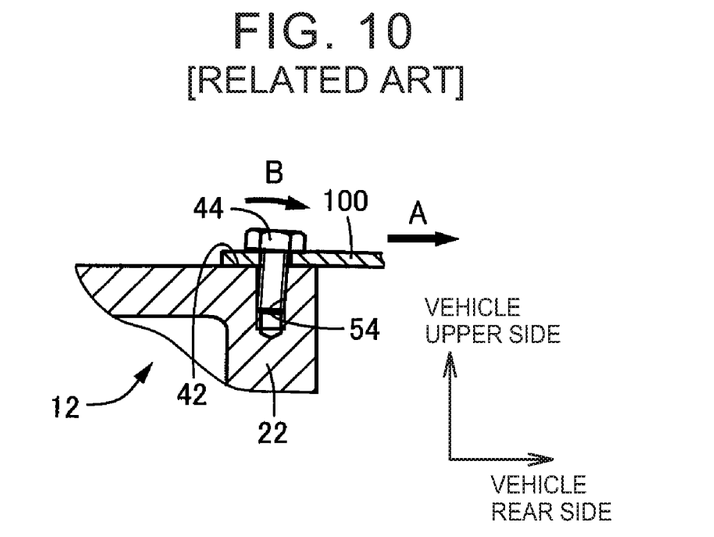
FIG. 10 is a sectional view for explaining that, in FIG. 9, there is a possibility that the intermediate bracket may be dislocated toward the rear side of the vehicle to thereby cause tilting of a bolt, resulting in failure of the transaxle case.

For example, as shown in FIG. 9, in the case where a flat-plate intermediate bracket 100 is fixed to a mounting surface 42 of a transaxle case 22 by a bolt 44 and where a rear-side support bracket 16 of an electronic control unit 20 is fixed to a protruding portion, protruding from the transaxle case 22 toward the rear side of the vehicle, of the intermediate bracket 100, a moment MA may be generated about a rear-side upper-end corner S, as a fulcrum, of the transaxle case 22 at the time of vehicle collision, so that a lifting load Fzb may act on a fastened portion by the bolt 44 due to the moment MA. Then, when such a lifting load Fzb acts thereon, a frictional force Fxa decreases correspondingly, and therefore, the intermediate bracket 100 may be dislocated toward the rear side of the vehicle due to a rearward load Fxb as shown by an arrow A in FIG. 10 to thereby cause the bolt 44 to tilt as shown by an arrow B, so that a crack or the like may occur starting from an opening portion of a threaded hole 54 due to prying or the like of the bolt 44 to thereby cause failure of the transaxle case 22.

SUMMARY

The present disclosure has been made in view of these circumstances and provides a mounting structure that, when a support bracket of an electronic control unit is fixed to an intermediate bracket protruding from a transaxle case toward a rear side of a vehicle, properly ensures the fixing strength of the intermediate bracket to the transaxle case.

Therefore, according to one aspect of the present disclosure, there is provided a mounting structure including an electronic control unit, a plurality of support brackets, a transaxle case, an intermediate bracket, and an engaging projection. The plurality of support brackets are provided so as to be spaced apart from each other in a longitudinal direction of a vehicle and to protrude downward. The electronic control unit is attached to the transaxle case in a state of floating above the transaxle case via the plurality of support brackets. The intermediate bracket is configured such that (i) the intermediate bracket is integrally fixed, in surface contact, to a flat mounting surface at a rear portion of an upper surface of the transaxle case and protrudes from the transaxle case toward a rear side of the vehicle, and that (ii) a rear-side support bracket, on the rear side of the vehicle, of the plurality of support brackets is fixed to a protruding portion, the protruding portion protruding from the transaxle case toward the rear side of the vehicle, of the intermediate bracket. The engaging projection is provided to at least one of an upper surface of the intermediate bracket or a bottom surface of the electronic control unit in a region where the intermediate bracket is in surface contact with the mounting surface, the engaging projection protruding in a direction toward the upper surface of the intermediate bracket and the bottom surface of the electronic control unit.

In the mounting structure described above, the engaging projection may be integrally provided to at least one of the upper surface of the intermediate bracket or the bottom surface of the electronic control unit. Alternatively, in the mounting structure described above, the engaging projection may be provided, as a separate member, to at least one of the upper surface of the intermediate bracket or the bottom surface of the electronic control unit.

In the mounting structure described above, although the rear-side support bracket of the electronic control unit is fixed to the protruding portion, protruding from the transaxle case toward the rear side of the vehicle, of the intermediate bracket, since the engaging projection is provided to at least one of the upper surface of the intermediate bracket or the bottom surface of the electronic control unit in the region where the intermediate bracket is in surface contact with the mounting surface of the transaxle case, the engaging projection protruding in the direction toward the upper surface of the intermediate bracket and the bottom surface of the electronic control unit, when the electronic control unit approaches the transaxle case at the time of vehicle collision, the intermediate bracket is pressed against the mounting surface of the transaxle case via the engaging projection.

Accordingly, even when a moment is generated by a load that is applied from the rear-side support bracket to the protruding portion of the intermediate bracket, resulting in that a lifting load acts on a fixed portion of the intermediate bracket to the transaxle case, that is cancelled due to a pressing load by the engaging projection, so that the fixing strength of the intermediate bracket is properly ensured. Further, since it is sufficient to only provide the engaging projection, a complicated design change is not necessarily required, and a design change can be easily carried out without impairing the assembling workability.

In the mounting structure described above, the engaging projection may be provided at positions under a pair of side walls located on both sides of the electronic control unit in a width direction of the vehicle.

According to the mounting structure described above, since the engaging projection is provided at the positions under the pair of side walls located on both sides of the electronic control unit in the width direction of the vehicle, the intermediate bracket is firmly pressed against the mounting surface of the transaxle case via the highly rigid side walls, and damage to the electronic control unit due to a reaction force of the pressing load is suppressed. In addition, since the engaging projection is provided at the positions under the pair of side walls on both sides in the width direction of the vehicle, the intermediate bracket is pressed against the mounting surface relatively stably regardless of a collision manner, so that the fixing strength to the transaxle case is ensured more properly.

In the mounting structure described above, the engaging projection may be provided so as to provide a gap between the intermediate bracket and the electronic control unit at a portion where the engaging projection is provided. The engaging projection may be configured to, when the electronic control unit approaches the transaxle case due to deformation of the support brackets at the time of vehicle collision and abuts against the intermediate bracket, press the intermediate bracket against the mounting surface responding to displacement of the electronic control unit.

According to the mounting structure described above, the gap is provided between the intermediate bracket and the electronic control unit even at the portion where the engaging projection is provided, while both are brought into abutment with each other via the engaging projection at the time of vehicle collision. Therefore, the attaching work for attaching the electronic control unit to the transaxle case using the support brackets can be carried out easily and quickly, and the required accuracy of dimensions of the respective portions can be relaxed compared to a case where the engaging projection is provided such that the intermediate bracket and the electronic control unit are substantially in contact with each other.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

A transaxle case houses therein a transaxle. The transaxle is a power transmission device that is transversely mounted in an FF (front-engine front-drive) vehicle. The transaxle includes a transmission and a final reduction gear and is housed in the transaxle case that is commonly used. The transmission may be a stepped or continuously variable mechanical transmission of a planetary gear type, a belt type, or the like, or may be an electric continuously variable transmission having an electric generator such as a motor generator and a differential mechanism. In the case of an electric vehicle such as a hybrid vehicle, a vehicle-travel electric motor such as a motor generator can also be housed in the transaxle case. An electronic control unit is configured by including, for example, inverters and control circuits for controlling the above-described electric generator and electric motor, but may alternatively be provided with a control device for performing shift control of the transmission, or the like. The electronic control unit is not necessarily the electronic control unit for transaxle control, but may be an electronic control unit for an engine, an accessory such as an air conditioner, or the like that is unrelated to the transaxle.

An intermediate bracket is, for example, a metal plate or an aluminum die casting having a generally flat-plate shape as a whole and is fixed to a mounting surface of the transaxle case using a fixing means, for example, a screw member such as a bolt, welding, caulking, or adhesive bonding. An L-shaped bracket, for example, is preferably used as a support bracket and is integrally fixed to a case of the electronic control unit, the transaxle case, or the intermediate bracket using a fixing means, for example, a screw member such as a bolt, welding, caulking, or adhesive bonding.

An engaging projection is provided to, for example, an upper surface of the intermediate bracket, but may alternatively be provided to a bottom surface of the electronic control unit or may be provided to both of them. In the mounting structure described above, the engaging projection is provided at the positions under the pair of side walls located on both sides of the electronic control unit in the width direction of the vehicle. When carrying out the mounting structure described above, one or a plurality of engaging projections may be provided at a portion or portions where a predetermined strength is obtained. In the mounting structure described above, for example, a pair of engaging projections are provided at the positions under the pair of side walls. However, various other modes are enabled, such as providing a single engaging projection so as to include positions under the pair of side walls. While the engaging projection can be integrally provided to the intermediate bracket, the case of the electronic control unit, or the like, a projection member formed as a separate member may be fixed using a fixing means such as a screw member, welding, or adhesive bonding. In the mounting structure described above, the predetermined gap is provided between the intermediate bracket and the electronic control unit at the portion where the engaging projection is provided. When carrying out the mounting structure described above, it may be configured that the intermediate bracket and the electronic control unit are substantially in contact with each other via the engaging projection even during a normal time such as an assembly time. The intermediate bracket and the electronic control unit can be integrally fixed to each other by a screw member or the like in a state where both are in contact with each other via the engaging projection.

Hereinbelow, embodiments of the present disclosure will be described in detail with reference to the drawings. In the following embodiments, the figures are simplified or deformed as appropriate such that the dimensional ratios, shapes, and so on of respective portions are not necessarily accurately shown.

Figure 1:
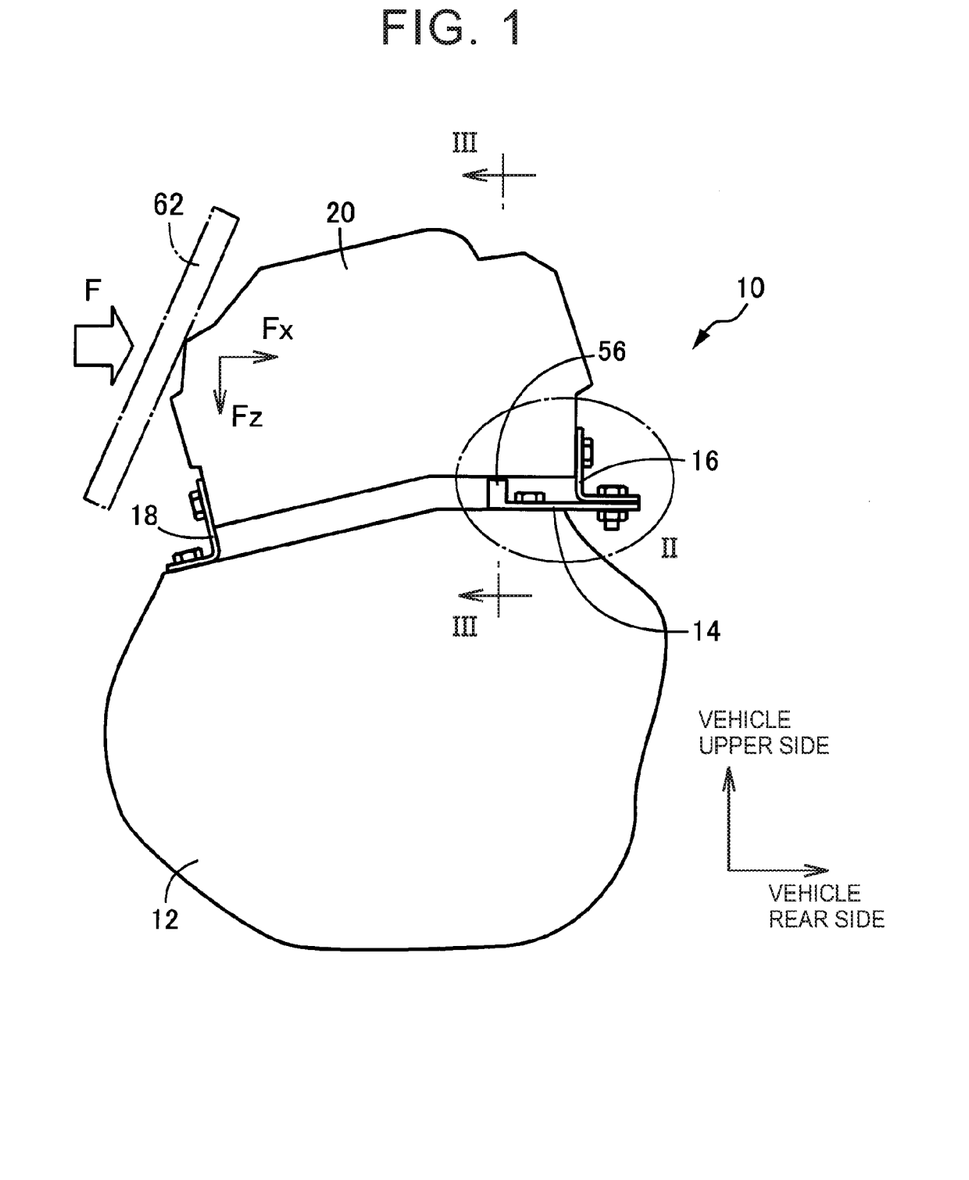
FIG. 1 is a schematic side view showing a mounting structure according to a first embodiment as one example of the present disclosure.
Figure 2:
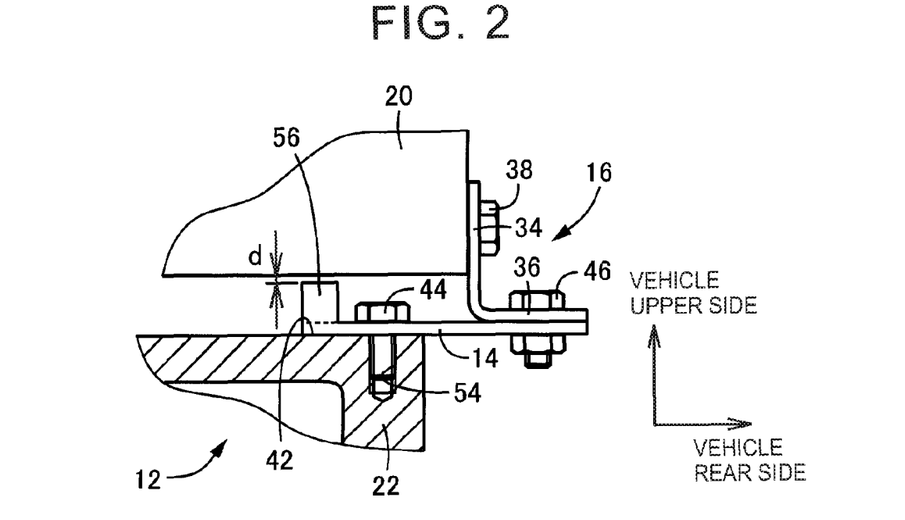
FIG. 2 is a partially sectioned enlarged view of a portion II in FIG. 1, i.e. a portion where an intermediate bracket and a rear-side support bracket are provided.
Figure 3:
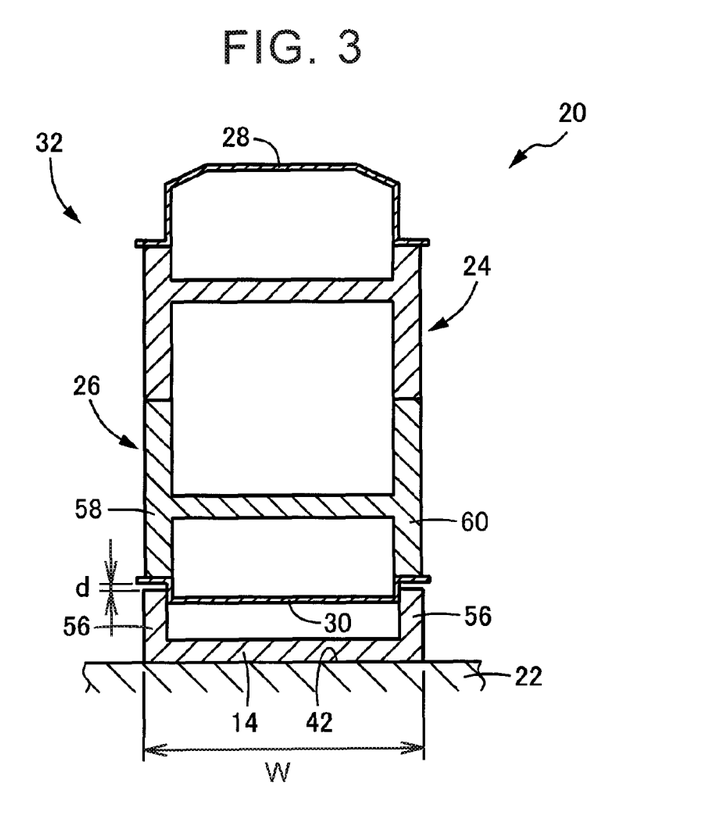
FIG. 3 is a sectional view taken along line of FIG. 1.

First, a first embodiment of the present disclosure will be described. FIG. 1 is a schematic side view showing a mounting structure 10 of the first embodiment of the present disclosure, wherein an electronic control unit 20 is attached to an upper portion of a transaxle 12 via an intermediate bracket 14, a rear-side support bracket 16, and a front-side support bracket 18. FIG. 2 is an enlarged view of a portion II in FIG. 1, i.e. a portion where the electronic control unit 20 is supported by the intermediate bracket 14 and the rear-side support bracket 16, wherein a transaxle case 22 is shown in section. FIG. 3 is a sectional view taken along line of FIG. 1.

The transaxle 12 is for an FF hybrid vehicle in which the transaxle 12 is transversely mounted in an engine room at the front of the vehicle, and includes, for example, an electric continuously variable transmission having an electric generator such as a motor generator and a differential mechanism, a vehicle-travel electric motor such as a motor generator, and a final reduction gear which are housed in the transaxle case 22 that is commonly used. The electronic control unit 20 is a transaxle-control PCU including inverters and control circuits for controlling the above-described electric generator and electric motor. As shown in FIG. 3, the electronic control unit 20 includes a PCU case 32 composed of a plurality of case members 24 and 26, an upper cover 28, a lower cover 30, and so on. As a material of the case members 24 and 26, an aluminum die casting is preferably used, but an aluminum casting, an iron-based material, a resin material such as FRP (fiber-reinforced plastic), or the like may alternatively be used. As a material of the covers 28 and 30, an iron plate is preferably used, but an aluminum-based material, a resin material, or the like may alternatively be used.

Figure 5:
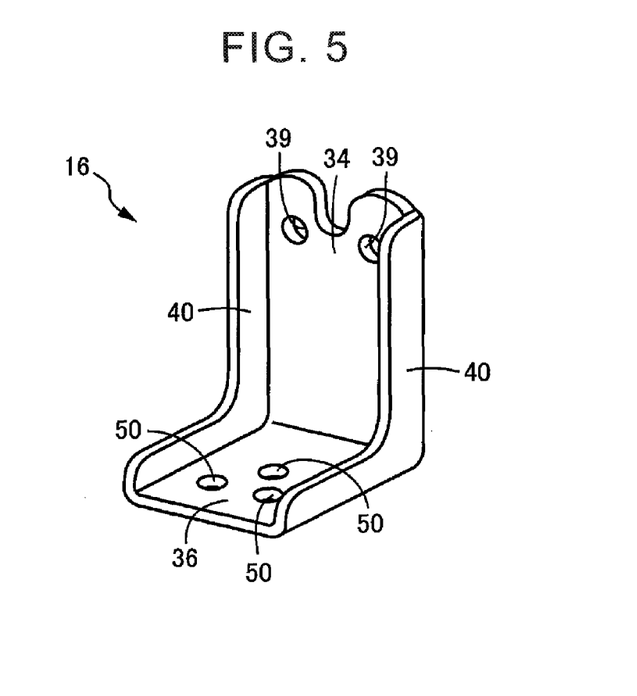
FIG. 5 is a perspective view for specifically explaining the rear-side support bracket that is preferably used in the first embodiment of FIG. 1.

The rear-side and front-side support brackets 16 and 18 correspond to support brackets that support the electronic control unit 20 in a state of floating above the transaxle case 22. For example, as shown in FIG. 5, the rear-side support bracket 16 is an L-shaped press-molded metal plate and has a relatively long vertical plate portion 34 and a horizontal plate portion 36. The rear-side support bracket 16 is integrally fixed to the electronic control unit 20 by bolts 38 in a state where the horizontal plate portion 36 protrudes downward with respect to the electronic control unit 20 and extends toward the rear side of the vehicle and where the vertical plate portion 34 abuts, back to back, against a rear end surface of a rear-side lower-end portion of the electronic control unit 20. In FIG. 5, the vertical plate portion 34 is formed with two bolt insertion holes 39 and fixed to the electronic control unit 20 using the two bolts 38, but the number of the bolt insertion holes 39 and the bolts 38 can be changed as appropriate. As shown in FIG. 5, if necessary, the rear-side support bracket 16 is provided at its both side portions with reinforcing flanges 40 that are each bent at approximately 90 degrees. The front-side support bracket 18 is configured substantially the same as the rear-side support bracket 16 and is integrally fixed to a front end surface of a front-side lower-end portion of the electronic control unit 20 while protruding downward from the electronic control unit 20. At portions where the support brackets 16 and 18 are fixed to the electronic control unit 20, elastic members such as rubber bushes are respectively interposed as needed.

The front-side support brackets 18 are each fixed directly to the transaxle case 22 by a plurality of bolts such that the front end portion of the electronic control unit 20 is supported in a state of floating above the transaxle case 22. On the other hand, the rear-side support brackets 16 protrude with respect to the transaxle case 22 toward the rear side of the vehicle and are fixed to the transaxle case 22 via the intermediate bracket 14. That is, in the case where the transaxle case 22 is commonly used regardless of the type of vehicle and where any one of a plurality of kinds of electronic control units with different sizes per type of vehicle is used as the electronic control unit 20, the electronic control unit 20 can be attached to the common transaxle case 22 by interposing the intermediate bracket 14 as needed. Conversely, even in the case where the electronic control unit 20 is common and where the transaxle case 22 differs per type of vehicle, the common electronic control unit 20 can be attached to any one of a plurality of kinds of the transaxle cases 22 by the use of the intermediate bracket 14.

Figure 4:
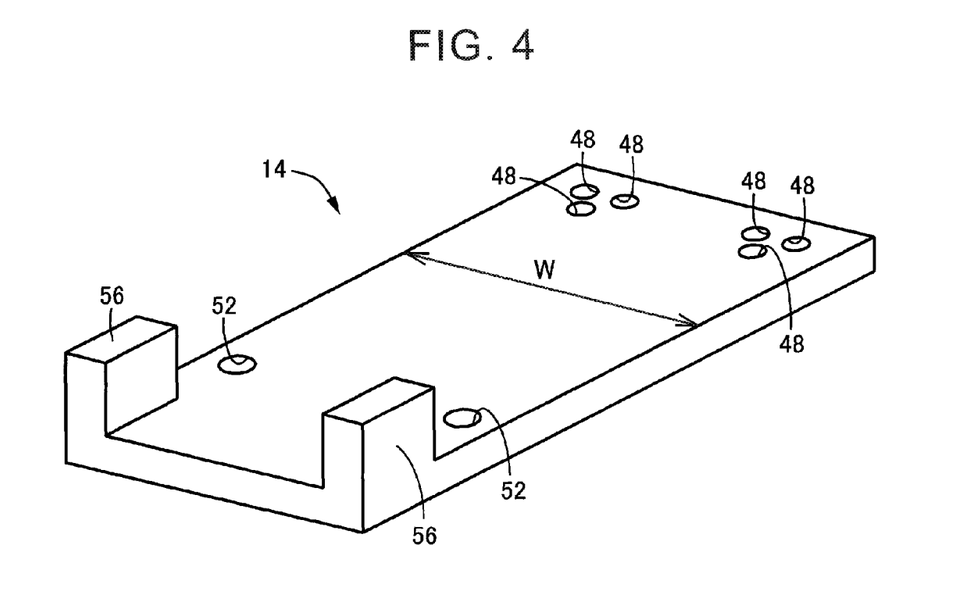
FIG. 4 is a perspective view for specifically explaining the intermediate bracket that is preferably used in the first embodiment of FIG. 1.

The intermediate bracket 14 is in surface contact with a generally horizontal flat mounting surface 42 at a rear-side upper-end portion of the transaxle case 22. The intermediate bracket 14 is integrally fixed to the mounting surface 42 of the transaxle case 22 by bolts 44 in the state where it is in surface contact with the mounting surface 42 such that one end portion of the intermediate bracket 14 protrudes in a cantilever fashion toward the rear side of the vehicle. As shown in FIG. 4, the intermediate bracket 14 has a rectangular flat-plate shape as a whole. Bolt insertion holes 48 through which bolts 46 for fixing the horizontal plate portions 36 of the rear-side support brackets 16 are inserted are formed at a protruding portion being the one end portion of the intermediate bracket 14. The bolt insertion holes 48 are provided in two sets that are spaced apart from each other in a width direction of the vehicle, each set including the three bolt insertion holes 48. On the other hand, the horizontal plate portion 36 of each rear-side support bracket 16 is formed with one set of (three) bolt insertion holes 50.

By inserting the three bolts 46 into the three bolt insertion holes 50 of each rear-side support bracket 16, the pair of rear-side support brackets 16 are fixed to the intermediate bracket 14. That is, the pair of rear-side support brackets 16 are attached to the end surface on the rear side of the vehicle of the electronic control unit 20 so as to be spaced apart from each other in the width direction of the vehicle and these pair of rear-side support brackets 16 are fixed to the intermediate bracket 14, so that the rear end portion of the electronic control unit 20 is supported in a state of floating above the transaxle case 22. The number of the bolts 46, i.e. the number of the bolt insertion holes 48 and 50, can be changed as appropriate.

On the proximal end side of the intermediate bracket 14, i.e. at a portion, in surface contact with the mounting surface 42 of the transaxle case 22, of the intermediate bracket 14, a plurality of (two in FIG. 4) bolt insertion holes 52 are formed so as to be spaced apart from each other in the width direction of the vehicle, and the intermediate bracket 14 is fixed to the mounting surface 42 by the two bolts 44. The mounting surface 42 is formed with threaded holes 54 respectively at two positions corresponding to the two bolt insertion holes 52, and the bolts 44 are screwed into the threaded holes 54. The number of the bolts 44, i.e. the number of the bolt insertion holes 52 and the threaded holes 54, can also be changed as appropriate.

A width W of the intermediate bracket 14 is substantially equal to that of the electronic control unit 20 in the width direction of the vehicle. At both side portions on the proximal end side of the intermediate bracket 14, i.e. at both side portions of the portion, in surface contact with the mounting surface 42, of the intermediate bracket 14, a pair of engaging projections 56 are provided so as to protrude upward. In other words, the pair of engaging projections 56 are provided so as to protrude in a direction toward a bottom surface of the electronic control unit 20. Since the width W of the intermediate bracket 14 is substantially equal to that of the electronic control unit 20 in the width direction of the vehicle, the engaging projections 56 are located just under a pair of side walls 58 and 60 on both left and right sides of the PCU case 32 as is clear from FIG. 3. The height of the engaging projection 56 is determined such that a slight gap d is provided between the engaging projection 56 and the bottom surface (precisely, a stepped surface provided at each of both side portions in the width direction of the vehicle) of the electronic control unit 20 that is attached via the support brackets 16 and 18. While the gap d is present during a normal time including an assembly time, when the support brackets 16 and 18 are deformed to lower the electronic control unit 20 at the time of vehicle collision, the gap d disappears, so that the engaging projections 56 abut against the bottom surface of the electronic control unit 20. The gap d is set to, for example, about 1 to 10 mm. The intermediate bracket 14 is made of, for example, an aluminum die casting and can be provided integrally with the engaging projections 56 of an arbitrary size at arbitrary positions. The intermediate bracket 14 may alternatively be made of a metal plate or the like. In this case, separate projection members may be integrally fixed to the intermediate bracket 14 by welding or the like, or the intermediate bracket 14 may be provided integrally with the engaging projections 56 by press bending or the like.

When the bottom surface of the electronic control unit 20 is flat, it is possible to provide a single elongated engaging projection in which the pair of engaging projections 56 are connected together. The width W of the intermediate bracket 14 is not necessarily constant in a longitudinal direction of the vehicle and may change continuously or stepwise, or is not necessarily equal to the width of the electronic control unit 20. When the width W of the intermediate bracket 14 is different from that of the electronic control unit 20, the position of disposition of the engaging projection 56 is appropriately determined in a range of positions under the PCU case 32. In this case, when the range includes a position just under the side wall 58, 60 of the PCU case 32, it is desirable to provide the engaging projection 56 at the position just under the side wall 58, 60.

Figure 6:
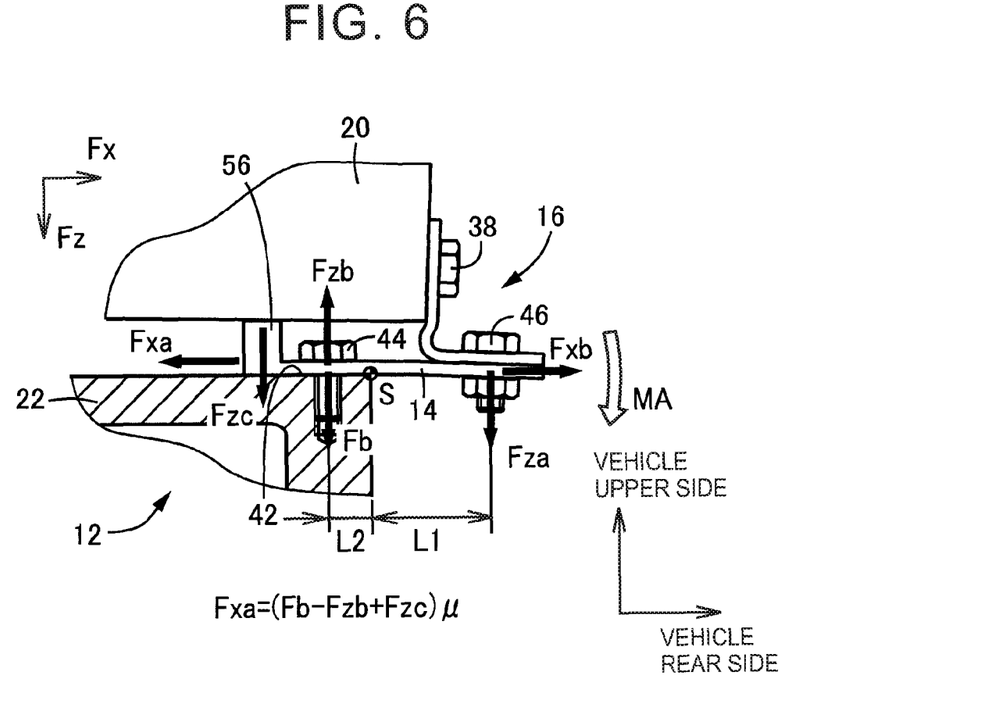
FIG. 6 is a diagram showing a state in which a gap d has disappeared at the time of vehicle collision, wherein loads that act on respective portions are also shown.

FIG. 6 shows a state in which the support brackets 16 and 18 are deformed to lower the electronic control unit 20 at the time of vehicle collision, so that the gap d has disappeared, resulting in that the engaging projections 56 abut against the bottom surface of the electronic control unit 20. That is, as shown in FIG. 1, when a collision load F toward the rear side of the vehicle is applied at the time of vehicle collision on the vehicle front side, resulting in that an in-vehicle component 62 such as a radiator provided in front of the engine room is deformed and displaced toward the rear side of the vehicle to abut against the electronic control unit 20, the electronic control unit 20 is displaced obliquely downward to the rear side of the vehicle due to a vehicle rearward component force Fx, a downward component force Fz, and the deformation of the support brackets 16 and 18. Then, on the protruding portion of the intermediate bracket 14, i.e. on the portion, where the rear-side support brackets 16 are fixed, of the intermediate bracket 14, a rearward load Fxb acts based on the vehicle rearward component force Fx and a downward load Fza acts based on the downward component force Fz. By the downward load Fza, a moment MA is generated about a rear-side upper-end corner S, as a fulcrum, of the transaxle case 22, so that a lifting load Fzb acts on the fastened portion by the bolts 44 due to the moment MA. The intermediate bracket 14 is pressed against the mounting surface 42 due to a fastening load (bolt axial force) Fb by the bolts 44 so as to be in frictional contact with the mounting surface 42. While the displacement of the intermediate bracket 14 due to the rearward load Fxb is prevented by a frictional force Fxa, the frictional force Fxa decreases due to the lifting load Fzb.

On the other hand, in the first embodiment, since the engaging projections 56 come into abutment with the bottom surface of the electronic control unit 20 and thus a pressing load Fzc is applied to the intermediate bracket 14 via the engaging projections 56, the decrease in the frictional force Fxa is suppressed correspondingly. That is, the final frictional force Fxa is expressed by the following formula (1) using a friction coefficient μ, wherein the decrease in the frictional force Fxa due to the lifting load Fzb caused by the moment MA is suppressed by the pressing load Fzc. In particular, since the downward component force Fz is divided into the downward load Fza and the pressing load Fzc, the moment MA itself due to the downward load Fza decreases to cause a decrease in the lifting load Fzb, so that the decrease in the frictional force Fxa is effectively suppressed. The relationship between the downward load Fza and the lifting load Fzb is expressed by the following formula (2) using moment lengths L1 and L2.

$$Fxa = (Fb - Fzb + Fzc) \times \mu \qquad (1)$$

$$Fza \times L1 = Fzb \times L2 \qquad (2)$$

In contrast, when the intermediate bracket 100 having no engaging projection 56 is used as shown in FIG. 9, since the pressing load Fzc is not obtained, a frictional force Fxa is expressed by the following formula (3) and thus the frictional force Fxa decreases corresponding to the pressing load Fzc. In addition, since a downward load Fza increases corresponding to the pressing load Fzc and since a lifting load Fzb is magnified relative to the downward load Fza according to a moment length ratio (L1/L2), the frictional force Fxa decreases still further. Then, when the frictional force Fxa becomes smaller than a rearward load Fxb, the intermediate bracket 100 may be dislocated toward the rear side of the vehicle due to the rearward load Fxb as shown by the arrow A in FIG. 10. This may cause the bolt 44 to tilt as shown by the arrow B, so that a crack or the like may occur starting from the opening portion of the threaded hole 54 due to prying or the like of the bolt 44 to thereby cause failure of the transaxle case 22.

$$Fxa=(Fb-Fzb)\times \mu \quad (3)$$

As described above, in the mounting structure 10 of the first embodiment, the rear-side support brackets 16 of the electronic control unit 20 are fixed to the protruding portion, protruding from the transaxle case 22 toward the rear side of the vehicle, of the intermediate bracket 14. However, since the engaging projections 56 protruding upward so as to approach the electronic control unit 20 are provided to the intermediate bracket 14 in its region that is in surface contact with the mounting surface 42 of the transaxle case 22, when the electronic control unit 20 approaches the transaxle case 22 due to the collision load F at the time of vehicle collision, the intermediate bracket 14 is pressed against the mounting surface 42 via the engaging projections 56. Therefore, the moment MA is generated due to the downward load Fza that is applied from the rear-side support brackets 16 to the protruding portion of the intermediate bracket 14. Then, even when the lifting load Fzb acts on the fixed portion of the intermediate bracket 14 to the transaxle case 22, i.e. on the fastened portion of the intermediate bracket 14 by the bolts 44, that is cancelled due to the pressing load Fzc by the engaging projections 56, so that the fixing strength of the intermediate bracket 14 is properly ensured. Specifically, the frictional force Fxa is properly maintained regardless of the lifting load Fzb, so that the dislocation of the intermediate bracket 14 due to the rearward load Fxb and damage to the transaxle case 22 due to such dislocation are suppressed.

Since it is sufficient to only provide the engaging projections 56 at predetermined positions of the intermediate bracket 14, a complicated design change is not necessarily required, and a design change can be easily carried out without impairing the assembling workability.

Since the engaging projections 56 are provided in a pair at the positions under the pair of side walls 58 and 60 located on both sides of the electronic control unit 20 in the width direction of the vehicle, the intermediate bracket 14 is firmly pressed against the mounting surface 42 of the transaxle case 22 via the highly rigid side walls 58 and 60, and damage to the PCU case 32 due to a reaction force of the pressing load Fzc is suppressed. In addition, since the pair of engaging projections 56 are provided on both sides in the width direction of the vehicle, the intermediate bracket 14 is pressed against the mounting surface 42 relatively stably regardless of a collision manner, so that the fixing strength to the transaxle case 22 is ensured more properly.

Since it is configured that the predetermined gap d is present between the engaging projections 56 and the electronic control unit 20 during a normal time including an assembly time and that the engaging projections 56 abut against the electronic control unit 20 at the time of vehicle collision, the attaching work for attaching the electronic control unit 20 to the transaxle case 22 using the support brackets 16 and 18 can be carried out easily and quickly, and the required accuracy of dimensions of the respective portions can be relaxed compared to a case where the engaging projections 56 are provided so as to be substantially in contact with the bottom surface of the electronic control unit 20.

Next, second and third embodiments of the present disclosure will be described. In the following second and third embodiments, portions that are substantially common to the first embodiment will be assigned the same reference symbols as those in the first embodiment, thereby omitting a detailed description thereof.

Figure 7:
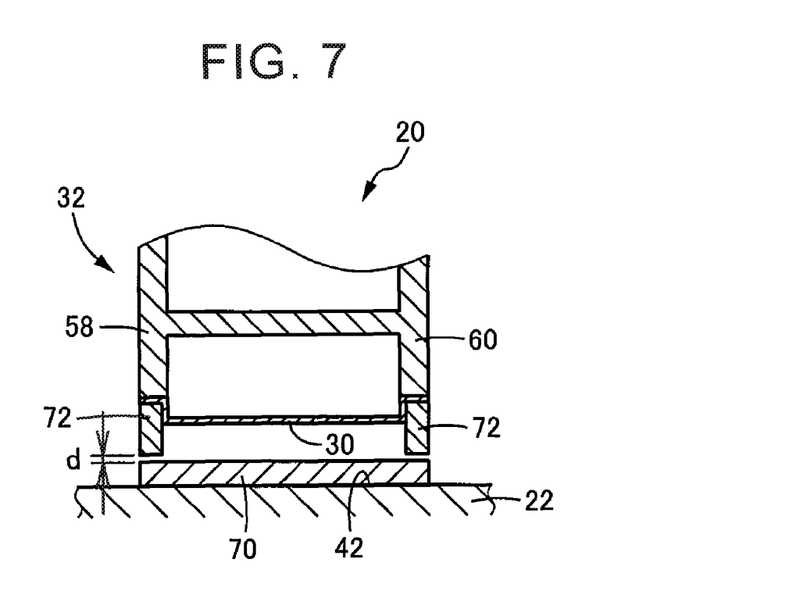
FIG. 7 is a sectional view for explaining a second embodiment of the present disclosure, wherein a pair of engaging projections are provided on the electronic control unit side.

The second embodiment will be described hereinbelow. In the first embodiment, the engaging projections 56 are integrally provided to the upper surface of the intermediate bracket 14. On the other hand, as shown in FIG. 7, it is possible to employ a flat-plate intermediate bracket 70 with the engaging projections 56 eliminated and to provide engaging projections 72 on the electronic control unit 20 side. In FIG. 7, the engaging projections 72 are engaging projections configured to be separate from a PCU case 32 of the electronic control unit 20 and are integrally fixed at positions under a pair of side walls 58 and 60 by welding, adhesive bonding, or the like so as to protrude downward. FIG. 7 is a sectional view corresponding to FIG. 3. Incidentally, also in the first embodiment, the engaging projections 56 may be configured to be separate as in FIG. 7 and may be integrally fixed to the intermediate bracket 14 by welding, adhesive bonding, or the like.

Figure 8:
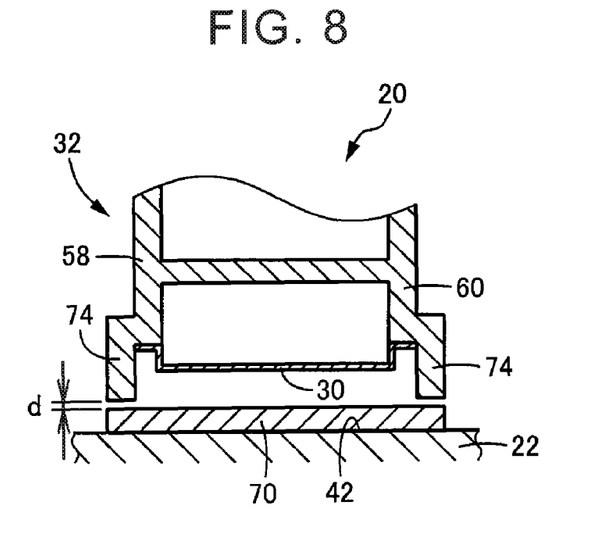
FIG. 8 is a sectional view for explaining a third embodiment of the present disclosure, wherein engaging projections are integrally provided to a pair of left and right side walls of an electronic control unit, respectively.

The third embodiment will be described hereinbelow. In the first embodiment, the engaging projections 56 are integrally provided to the upper surface of the intermediate bracket 14. On the other hand, as shown in FIG. 8, it is possible to employ a flat-plate intermediate bracket 70 with the engaging projections 56 eliminated and to provide engaging projections 74 on the electronic control unit 20 side. In FIG. 8, the engaging projections 74 are integrally provided to side walls 58 and 60 of a PCU case 32 of the electronic control unit 20, and each engaging projection 74 is bent in a crank shape so as to bypass a lower cover 30 and protrudes downward. The width of the intermediate bracket 70 is increased to reach the engaging projections 74 on both sides. FIG. 8 is a sectional view corresponding to FIG. 3.

While the embodiments of the present disclosure have been described in detail with reference to the drawings, these are by way of example only, and the present disclosure can be carried out in various modes added with changes or improvements based on the knowledge of those skilled in the art.

What is claimed is:
1. A mounting structure comprising:
an electronic control unit;
a plurality of support brackets that are provided so as to be spaced apart from each other in a longitudinal direction of a vehicle and to protrude downward;
a transaxle case to which the electronic control unit is attached in a state of floating above the transaxle case via the plurality of support brackets;
an intermediate bracket that is configured such that (i) the intermediate bracket is integrally fixed, in surface contact, to a flat mounting surface at a rear portion of an upper surface of the transaxle case and protrudes from the transaxle case toward a rear side of the vehicle, and that (ii) a rear-side support bracket, on the rear side of the vehicle, of the plurality of support brackets is fixed to a protruding portion, the protruding portion protrud- ing from the transaxle case toward the rear side of the vehicle, of the intermediate bracket; and an engaging projection that is provided to at least one of an upper surface of the intermediate bracket or a bottom surface of the electronic control unit in a region where the intermediate bracket is in surface contact with the mounting surface, the engaging projection protruding in a direction toward the upper surface of the intermediate bracket and the bottom surface of the electronic control unit.

2. The mounting structure according to claim 1, wherein the engaging projection is integrally provided to at least one of the upper surface of the intermediate bracket or the bottom surface of the electronic control unit.

3. The mounting structure according to claim 1, wherein the engaging projection is provided, as a separate member, to at least one of the upper surface of the intermediate bracket or the bottom surface of the electronic control unit.

4. The mounting structure according to claim 1, wherein the engaging projection is provided at positions under a pair of side walls located on both sides of the electronic control unit in a width direction of the vehicle.

5. The mounting structure according to claim 1, wherein (i) the engaging projection is provided so as to provide a gap between the intermediate bracket and the electronic control unit at a portion where the engaging projection is provided, and (ii) the engaging projection is configured to, when the electronic control unit approaches the transaxle case due to deformation of the support brackets at the time of vehicle collision and abuts against the intermediate bracket, press the intermediate bracket against the mounting surface responding to displacement of the electronic control unit.

* * * * *